US012800789B2

(12) United States Patent
Shi et al.

(10) Patent No.: US 12,800,789 B2
(45) Date of Patent: Nov. 17, 2026

(54) METHOD FOR JOINTLY ESTIMATING SOIL PROFILE SALINITY BY USING TIME-SERIES REMOTE SENSING IMAGE

(71) Applicant: ZHEJIANG UNIVERSITY, Zhejiang (CN)

(72) Inventors: Zhou Shi, Zhejiang (CN); Nan Wang, Zhejiang (CN); Jie Peng, Zhejiang (CN); Jie Xue, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 370 days.

(21) Appl. No.: 18/655,308

(22) Filed: May 5, 2024

(65) Prior Publication Data

US 2024/0288602 A1 Aug. 29, 2024

Related U.S. Application Data

(63) Continuation of application No. PCT/CN2022/132570, filed on Nov. 17, 2022.

(30) Foreign Application Priority Data

Nov. 18, 2021 (CN) ......................... 202111370955.2

(51) Int. Cl.
*G01V 3/10* (2006.01)
*G06V 10/32* (2022.01)
(Continued)

(52) U.S. Cl.
CPC ................ *G01V 3/10* (2013.01); *G06V 10/32* (2022.01); *G06V 10/766* (2022.01); *G06V 20/13* (2022.01); *G06V 20/188* (2022.01)

(58) Field of Classification Search
CPC ........ G01V 3/10; G06V 10/32; G06V 10/766; G06V 20/13; G06V 20/188; Y02A 90/30
See application file for complete search history.

(56) References Cited

U.S. PATENT DOCUMENTS

2015/0347647 A1 12/2015 Osborne

FOREIGN PATENT DOCUMENTS

CN 110243773 B * 2/2020 ............. G01N 27/06
CN 112213287 B * 4/2021 ............. G01N 21/84
(Continued)

OTHER PUBLICATIONS

"International Search Report (Form PCT/ISA/210) of PCT/CN2022/132570", mailed on Feb. 9, 2023, with English translation thereof, pp. 1-4.

(Continued)

*Primary Examiner* — Eman A Alkafawi
*Assistant Examiner* — Dilara Sultana
(74) *Attorney, Agent, or Firm* — JCIPRNET

(57) ABSTRACT

A method for jointly estimating soil profile salinity by using time-series remote sensing image is provided. The method includes following. First, soil profile sample (1 meter), EM38-MK2 soil conductivity data, and a long time series monthly average Sentinel-2 satellite remote sensing image data for describing the same object is obtained. Secondly, the salt content of the soil profile with a depth of 1 meter is obtained according to linear regression equation and profile salt content calculation formula. Then, indices based on the time-series monthly average Sentinel-2 images are obtained to serve as independent variables of modeling by using a random forest to screen the independent variables. Finally, the salt contents of soil profile at 1 meter of the sample points are used as dependent variables, a temporal convolution network regression model is used for estimating, and a distribution map of the salt contents of the soil profile of large-space-scale is obtained.

10 Claims, 2 Drawing Sheets

(51) Int. Cl.

| | |
|---|---|
| ***G06V 10/766*** | (2022.01) |
| ***G06V 20/10*** | (2022.01) |
| ***G06V 20/13*** | (2022.01) |

(56) References Cited

FOREIGN PATENT DOCUMENTS

| | | |
|---|---|---|
| CN | 113125383 | 7/2021 |
| CN | 113221445 | 8/2021 |
| CN | 114062439 | 2/2022 |

OTHER PUBLICATIONS

"Written Opinion of the International Searching Authority (Form PCT/ISA/237) of PCT/CN2022/132570", mailed on Feb. 9, 2023, pp. 1-4.

* cited by examiner

METHOD FOR JOINTLY ESTIMATING SOIL PROFILE SALINITY BY USING TIME-SERIES REMOTE SENSING IMAGE

CROSS-REFERENCE TO RELATED APPLICATION

This application is a continuation of international application of PCT application serial no. PCT/CN2022/132570 filed on Nov. 17, 2022, which claims the priority benefit of China application no. 202111370955.2 filed on Nov. 18, 2021. The entirety of each of the above mentioned patent applications is hereby incorporated by reference herein and made a part of this specification.

BACKGROUND

Technical Field

The disclosure relates to the field of remote sensing inversion, and particularly relates to an algorithm for high-precision estimation of a salt content of a soil profile (1 meter) of time-series based Sentinel-2 data.

Description of Related Art

Soil salinization is one of the globally facing land degradation problems. Primary salinization and secondary salinization significantly harm soil health and crop production. Especially in arid and semi-arid areas, soil evapotranspiration is higher than precipitation, causing salt in the soil to move upward as water evaporates, forming a salt crust on the surface of the soil. Monitoring and visualization of soil salinization is of great significance to the protection and utilization of soil resources, especially cultivated land. Ground surveys and near-ground soil sensing surveys are direct means and sources of salt information, and can precisely represent the salt content and distribution of the soil at sample points, but cannot accurately describe the distribution of soil salt in large areas and conduct rapid surveys in the same period. Compared with conventional field survey methods, satellite remote sensing has characteristics of wide spatial coverage, high observation spatial resolution, and short time return period, which can quickly provide a large amount of information about soil and has gradually become an important method for soil salinity monitoring.

The depth of soil salinity characterization by optical remote sensing satellites is limited. Previous studies focused on monitoring soil salinity in topsoil (0-0.2 meters), but performed poorly in estimating soil salinity in the root zone or subsoil. Salt moves in the vertical direction with the movement of water in the soil. Phenomena such as precipitation, evapotranspiration, land management measures (salt washing, crop sowing, irrigation, harvesting) occur periodically, resulting in periodic transport of salt in the soil profile. Therefore, the salt content in the topsoil does not fully reflect soil health. The method for obtaining soil information by using a remote sensing image in a single period is highly time-effective, but is limited to the monitoring of surface soil salt return in a single period and cannot achieve a comprehensive assessment of the salt content of the soil profile. In view of the limitations of the remote sensing image in the single period in estimating soil profile salinity, time-series analysis needs to be performed on remote sensing images in multiple periods to expand the depth of the ground observation, so as to achieve a comprehensive estimate of the salt content of the soil profile at a depth of 1 meter.

SUMMARY

The purpose of the disclosure is to solve the problems existing in the related art and provide a method for jointly estimating soil profile salinity by using a time-series remote sensing image.

The specific technical solutions of the disclosure are as follows.

A method for jointly estimating soil profile salinity by using a time-series remote sensing image includes the steps as follows.

S1: Single Sentinel-2 satellite remote sensing image data and ground survey data corresponding to an area to be measured in a period to be estimated are obtained. At the same time, a Sentinel-2 satellite remote sensing image historical sequence of the area to be measured before the period to be estimated is obtained.

The ground survey data comprises multi-depth measured conductivity data and EM38-MK2 conductivity data collected in the period to be estimated. The multi-depth measured conductivity data comprises segmented conductivity data of each soil sample point in a first soil sample point set, and the segmented conductivity data comprises each conductivity of different soil layer depths of a soil profile with a depth of 1 meter measured at locations of the soil sample points after sampling in segments according to a set interval, in which a soil layer where the soil surface is located is a soil surface layer. The EM38-MK2 conductivity data comprises the multi-mode conductivity data of each soil sample point in a second soil sample point set. The multi-mode conductivity data comprises multiple conductivities measured at locations of the soil sample points at different depths and according to different modes. The first soil sample point set is a subset of the second soil sample point set.

S2: Multi-source data matching is performed on the three types of data obtained in S1 according to S21-S23.

S21: Linear regression is performed on the segmented conductivity data and the multi-mode conductivity data corresponding to each soil sample point in the first soil sample point set, so that a linear regression model may estimate the segmented conductivity data of the same soil sample point based on the multi-mode conductivity data.

S22: For each soil sample point in the second soil sample point set, each conductivity of five soil layer depths corresponding to each soil sample point is estimated by using the linear regression model, and conversion is performed according to the conductivities to obtain salt contents of different soil layer depths of the soil profile. After the different soil layer depths are integrated, a total salt content of soil profile at 1 meter is obtained.

S23: Temporal resolutions of the Sentinel-2 satellite remote sensing image historical sequence obtained in S1 are normalized to obtain a monthly average Sentinel-2 image data set with spatial resolutions and the temporal resolutions both unified.

S3: Based on the single Sentinel-2 satellite remote sensing image data and the salt content data of the soil surface layer of each soil sample point in the second soil sample point set obtained in S22, an independent variable set to be selected is constructed as explanatory variables by using a single band and band combination method for calculation. The salt content of the soil surface layer is used as an explained variable. An independent variable select model is constructed to perform selecting on variables in the independent variable set to be selected to obtain an optimal independent variable combination for observing the salt content of the soil surface layer. Each feature value in the optimal independent variable combination is calculated pixel by pixel for each satellite remote sensing image in the monthly average Sentinel-2 image data set to obtain a long time series index data set based on the remote sensing images.

S4: The feature values in the optimal independent variable combination in the long time series index data set corresponding to each soil sample point in the second soil sample point set are used as independent variables, all of the total salt contents of soil profile at 1 meter of the respective soil sample points in the second soil sample point set obtained in S22 are used as dependent variables, and a spatiotemporal regression model is constructed. Finally, based on the long time series index data set, the salt content of soil profile at 1 meter at a location of each pixel in the area to be measured is predicted by using the spatiotemporal regression model, and a spatial distribution map of the salt contents of soil profile at 1 meter corresponding to the period to be estimated is formed.

Preferably, in the multi-depth measured conductivity data, the soil profile with the depth of 1 meter are sampled in segments at each soil sample point according to an interval of 0.2 m at 0-0.2 m, 0.2-0.4 m, 0.4-0.6 m, 0.6-0.8 m, and 0.8-1 m, a conductivity of each of the segments of the soil is measured, and the conductivity of each of the five soil layer depths are obtained to form the multi-depth measured conductivity data.

Preferably, in the EM38-MK2 conductivity data, four conductivities are measured respectively in a horizontal mode and a vertical mode at a depth of 0.75 meters and 1.5 meters at each soil sample point by using an EM38-MK2 electromagnetic induction meter to form the multi-mode conductivity data.

Preferably, the Sentinel-2 satellite remote sensing image historical sequence is a Sentinel-2 satellite remote sensing image of the area to be measured obtained from three years before the period to be estimated to one year before the period to be estimated, a time period is 24 months, and an image spatial resolution is 10 m.

Preferably, the linear regression model is in a form as follows.

$$EC_{1:5\,(a-bm)} = A + B \times EC_{ah0.75} + C \times EC_{ah1.5} + D \times EC_{av0.75} + E \times EC_{av1.5}$$

In the formula, $EC_{1:5(a-bm)}$ represents a conductivity corresponding to a soil layer depth of a-b m, $EC_{ah0.75}$ represents a conductivity measured in the horizontal mode at a depth of 0.75 meters by using the EM38-MK2 electromagnetic induction meter, $EC_{ah1.5}$ represents a conductivity measured in the horizontal mode at a depth of 1.5 meters by using the EM38-MK2 electromagnetic induction meter, $EC_{av0.75}$ represents a conductivity measured in the vertical mode at a depth of 0.75 meters by using the EM38-MK2 electromagnetic induction meter, and $EC_{av1.5}$ represents a conductivity measured in the vertical mode at a depth of 1.75 meters by using the EM38-MK2 electromagnetic induction meter; and A, B, C, D, and E represent five regression coefficients respectively.

Preferably, in S22, when performing conversion according to the conductivities to obtain the salt contents of the different soil layer depths of the soil profile, soluble salt contents are first converted based on the conductivities, and then the salt contents of the soil are calculated according to the soluble salt contents.

Preferably, in S22, an integration method for integrating the different soil layer depths to obtain the total salt content of soil profile at 1 meter is an accumulation method, and an accumulation formula is:

$$Y_{0-1m} = Y_{0-0.2m} + Y_{0.2-0.4m} + Y_{0.4-0.6m} + Y_{0.6-0.8m} + Y_{0.8-1m}$$

In the formula, $Y_{0\text{-}1m}$ represents the total salt content of soil profile at 1 meter; and $Y_{0\text{-}0.2m}$, $Y_{0.2\text{-}0.4m}$, $Y_{0.4\text{-}0.6m}$, $Y_{0.6\text{-}0.8m}$, and $Y_{0.8\text{-}1m}$ are respectively the salt contents of the five soil layer depths, 0-0.2 m, 0.2-0.4 m, 0.4-0.6 m, 0.6-0.8 m, and 0.8-1 m.

Preferably, each satellite remote sensing image in the monthly average Sentinel-2 image data set is obtained by averaging all Sentinel-2 satellite remote sensing images in the same month.

Preferably, in S3, the independent variable select model is a random forest model, and the independent variable set to be selected comprises a spectral feature, a vegetation index feature, a salt index feature, and a soil-related index feature. The random forest model selects the variables in the independent variable set to be selected based on a significance of a mean square error and a purity of a node to obtain several variables with a highest correlation with a soil salt content in a topsoil to form the optimal independent variable combination.

Preferably, the spatiotemporal regression model in S4 is a regression model constructed based on a temporal convolution network.

Compared with related art, the disclosure has beneficial effects as follows.

The disclosure proposes a method for inverting a salt content of a 1-meter-deep soil profile based on a time-series Sentinel-2 satellite remote sensing data set and ground measured values, and finally a spatial variation result of the salt content of the soil profile of high spatial resolution and high quality with a spatial resolution of 10 m is obtained. Through estimating the salt content of the soil profile according to the method of the disclosure, breakthrough is achieved in the bottleneck of observing the salt content of the soil profile based on remote sensing data, and a new method for estimating the salt content of the soil profile of large-space-scale is provided, which is beneficial to the formulation of management and improvement policies for large-space-scale soil salinity of soil profile and bottom layer, and has certain theoretical and practical significance and promotion and application value.

DESCRIPTION OF THE EMBODIMENTS

Figure 1:
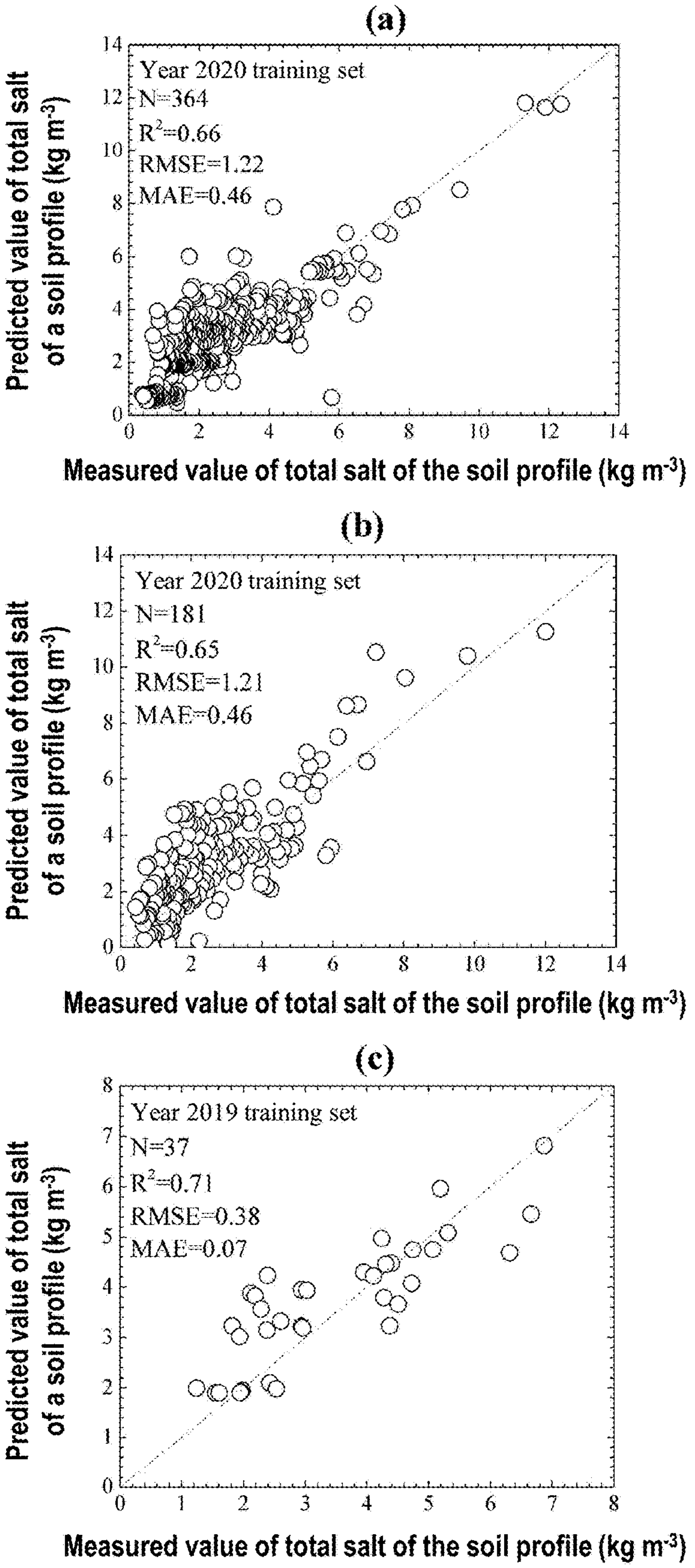
FIG. 1 shows scatter diagrams of estimated values of salt contents of the soil profile in a 2020 data modeling set (a of FIG. 1), estimated values of salt contents of the soil profile in a 2020 testing set (b of FIG. 1), and estimated values of salt contents of the soil profile in a 2019 testing set (c of FIG. 1), representing validation results of the salinity data obtained by estimating according to the disclosure versus ground measured values.

The disclosure will be further elaborated and described below together with the accompanying drawings and specific embodiments. The technical features of various embodiments of the disclosure may be combined accordingly as long as the features do not conflict with each other.

In a preferred embodiment of the disclosure, a method for jointly estimating soil profile salinity by using a time-series remote sensing image is provided. The specific steps of the method are as follows.

S1. Single Sentinel-2 satellite remote sensing image data and ground survey data corresponding to an area to be measured in a period to be estimated are obtained. At the same time, a Sentinel-2 satellite remote sensing image historical sequence of the area to be measured before the period to be estimated is obtained.

The two types of data, the single Sentinel-2 satellite remote sensing image data and the ground survey data, need to be collected simultaneously in the period to be estimated. For example, if the period to be estimated is a certain month, then the single Sentinel-2 satellite remote sensing image data and the ground survey data need to be data collected in the month. The ground survey data includes multi-depth measured conductivity data and EM38-MK2 conductivity data collected in the period to be estimated, and the two types of conductivity data also need to be collected simultaneously in the period to be estimated.

The multi-depth measured conductivity data includes segmented conductivity data of each soil sample point in a first soil sample point set, the segmented conductivity data of each soil sample point includes each conductivity of different soil layer depths of a soil profile with a depth of 1 meter measured at locations of the soil sample points after sampling in segments according to a set interval, in which in all soil layer depths, a soil layer where the soil surface is located is a soil surface layer.

In the multi-depth measured conductivity data of this embodiment, the soil profile with the depth of 1 meter at each soil sample point is sampled in segments at 0-0.2 m, 0.2-0.4 m, 0.4-0.6 m, 0.6-0.8 m, and 0.8-1 m according to an interval of 0.2 m, and the conductivity of each segment of soil is measured by using a conductivity meter. The conductivity of each of the five soil layer depths is obtained, and sequentially recorded as $EC_{1:5\ (0\text{-}0.2m)}$, $EC_{1:5(0.2\text{-}0.4m)}$, $EC_{1:5(0.4\text{-}0.6m)}$, $EC_{1:5(0.6\text{-}0.8m)}$, and $EC_{1:5(0.8\text{-}1m)}$. The five conductivities of one soil sample point form the segmented conductivity data of the soil sample point.

The EM38-MK2 conductivity data includes multi-mode conductivity data of each soil sample point in a second soil sample point set, in which the multi-mode conductivity data of each soil sample point includes multiple conductivities measured at locations of the soil sample points at different depths and according to different modes.

In the EM38-MK2 conductivity data of this embodiment, four conductivities are measured respectively in a horizontal mode and a vertical mode at a depth of 0.75 meters and 1.5 meters at each soil sample point by using an EM38-MK2 electromagnetic induction meter. Respectively, the measured values are a conductivity $EC_{ah0.75}$ measured in the horizontal mode at the depth of 0.75 meters, a conductivity $EC_{ah1.5}$ measured in the horizontal mode at the depth of 1.5 meters, a conductivity $EC_{av0.75}$ measured in the vertical mode at the depth of 0.75 meters, and a conductivity $EC_{av1.5}$ measured in the vertical mode at the depth of 1.75 meters. The four conductivities obtained at different depths and in different modes of one soil sample point form the multi-mode conductivity data of the soil sample point.

It should be noted that the segmented conductivity data requires the collection of soil of different soil layer depths for measurement, while the multi-mode conductivity data only needs to be measured at two different depths by using the EM38-MK2 electromagnetic induction meter, and thus the multi-mode conductivity data is easier to obtain and more efficient than the segmented conductivity data. Therefore, in the disclosure, segmented conductivity data of a small amount of soil sample points may be collected through ground surveys in the area to be measured, and on the other hand, multi-mode conductivity data of a large amount of soil sample points may be collected. Afterward, a regression model is established between the segmented conductivity data and the multi-mode conductivity data to realize the conversion of the two types of data, so as to efficiently obtain segmented conductivity data of a large number of soil sample points for estimating soil profile salinities of different soil sample points in the area to be measured.

However, it should be noted that in order to ensure that the regression model may be established between the segmented conductivity data and the multi-mode conductivity data, the segmented conductivity data and the multi-mode conductivity data used for modeling need to be collected from the same batch of soil sample points. Therefore, the first soil sample point set should be a subset of the second soil sample point set, that is, the soil sample points in the first soil sample point set are all included in the second soil sample point set. However, the number of the soil sample points in the second soil sample point set should be greater than the number of the soil sample points in the first soil sample point set, so as to have sufficient sample numbers for subsequent modeling.

In the Sentinel-2 satellite remote sensing images of this embodiment, the spatial resolution of the remote sensing images is all 10 m. However, temporal resolutions differ due to objective reasons such as data quality, and need to be unified later.

Generally speaking, the three types of data belong to multi-source data from different sources, in which the multi-depth measured conductivity data is characterized by small spatial range and small sample size; the EM38-MK2 conductivity data is characterized by small spatial range and large sample size; and the Sentinel-2 satellite remote sensing image historical sequence is characterized by large spatial scale and long time series.

S2. Multi-source data matching is performed on the three types of data obtained in S1, namely the single Sentinel-2 satellite remote sensing image data, the ground survey data, and the Sentinel-2 satellite remote sensing image historical sequence, according to S21~S23. The specific process is as follows.

S21. Linear regression is perform on the segmented conductivity data and the multi-mode conductivity data corresponding to each soil sample point in the first soil sample point set, and a linear regression model is obtained. The linear regression model may estimate the segmented conductivity data corresponding to the soil sample point based on the multi-mode conductivity data of each soil sample point.

In this embodiment, the linear regression model is in a form as follows:

$$EC_{1:5\ (a-bm)} = A + B \times EC_{ah0.75} + C \times EC_{ah1.5} + D \times EC_{av0.75} + E \times EC_{av1.5}$$

In the formula, $EC_{1:5(a\text{-}bm)}$ represents a conductivity corresponding to a soil layer depth of a-b m, $EC_{ah0.75}$ represents a conductivity measured in the horizontal mode at a depth of 0.75 meters by using the EM38-MK2 electromagnetic induction meter, $EC_{ah1.5}$ represents a conductivity measured in the horizontal mode at a depth of 1.5 meters by using the EM38-MK2 electromagnetic induction meter, $EC_{av0.75}$ represents a conductivity measured in the vertical mode at a depth of 0.75 meters by using the EM38-MK2 electromagnetic induction meter, and $EC_{av1.5}$ represents a conductivity measured in the vertical mode at a depth of 1.75 meters by using the EM38-MK2 electromagnetic induction meter; and A, B, C, D, and E represent five regression coefficients respectively.

For conductivities $EC_{1:5(a\text{-}bm)}$ corresponding to different soil layer depths, the forms of the linear regression model are the same, but the regression coefficients are different. The specific regression coefficients need to be determined after fitting the sample data. For example, in the following embodiment, the linear regression models of the five different soil layer depths are respectively:

$$EC_{1:5(0-0.2m)} = 0.102 + 0.013 \times EC_{ah0.75} + 0.018 \times EC_{ah1.5} - 0.002 \times EC_{av0.75} + 0.013 \times EC_{av1.5}$$

$$EC_{1:5(0.2-0.4m)} = -0.154 - 0.001 \times EC_{ah0.75} + 0.023 \times EC_{ah1.5} + 0.005 \times EC_{av0.75} - 0.014 \times EC_{av1.5}$$

$$EC_{1:5(0.4-0.6m)} = -0.247 - 0.012 \times EC_{ah0.75} + 0.027 \times EC_{ah1.5} + 0.001 \times EC_{av0.75} - 0.001 \times EC_{av1.5}$$

$$EC_{1:5(0.6-0.8m)} = -0.118 - 0.012 \times EC_{ah0.75} + 0.015 \times EC_{ah1.5} + 0.007 \times EC_{av0.75} - 0.005 \times EC_{av1.5}$$

$$EC_{1:5(0.8-1m)} = 0.028 - 0.009 \times EC_{ah0.75} + 0.013 \times EC_{ah1.5} + 0.003 \times EC_{av0.75} - 0.004 \times EC_{av1.5}$$

S22. For each soil sample point in the second soil sample point set, the multi-mode conductivity data of each soil sample point may be input into the linear regression model, the segmented conductivity data of each soil sample point is estimated by using the linear regression model, that is, the conductivity of each of the five soil layer depths corresponding to each soil sample point. There is a direct correlation between the conductivity of the soil and the salt content of the soil, and based on the correlation between the conductivity and the salt content, the salt contents at different soil layer depths of the soil profile may be obtained by converting the conductivities at different soil layer depths, thereby the total salt content of soil profile at 1 meter is obtained by integrating the different soil layer depths of soil profile at 1 meter.

It should be noted that the correlation conversion formula between the conductivity of the soil and the salt content of the soil may be measured based on actual data, or may be determined based on the conversion formula given in the related art. Generally speaking, when performing conversion according to the conductivities to obtain the salt contents of the different soil layer depths of the soil profile, soluble salt contents may first be converted according to the conductivity, and then the salt content of the soil is calculated according to the soluble salt content.

In this embodiment, the calculation formula for the soluble salt content c is c(g/kg)=0.0275*EC-0.0573, in which EC refers to the conductivity of the soil, in the unit of mS/m. The calculation formula of the salt content of any one of the soil layer depths is:

$$Y=\rho\times c/1000$$

In the formula, Y represents a salt content of the profile obtained by the calculation, in $kg/m^3$; ρ represents a soil bulk density, in $kg/m^3$, and c represents the soluble salt content, in g/kg. Since the intervals of the soil layers in this embodiment are 0.2 m, the result calculated by the formula is the soluble salt content per 0.2 m depth of the soil profile.

In addition, an integration method for integrating different soil layer depths to obtain the total salt content of soil profile at 1 meter is an accumulation method, and the accumulation formula is:

$$Y_{0-1m} = Y_{0-0.2m} + Y_{0.2-0.4m} + Y_{0.4-0.6m} + Y_{0.6-0.8m} + Y_{0.8-1m}$$

In the formula, $Y_{0\text{-}1m}$ represents the total salt content of soil profile at 1 meter; and $Y_{0\text{-}0.2m}$, $Y_{0.2\text{-}0.4m}$, $Y_{0.4\text{-}0.6m}$, $Y_{0.6\text{-}0.8m}$, and $Y_{0.8\text{-}1m}$ are respectively the salt contents of the five soil layer depths, 0-0.2 m, 0.2-0.4 m, 0.4-0.6 m, 0.6-0.8 m, and 0.8-1 m.

According to S22, each soil sample point in the second soil sample point set is processed and calculated to obtain the soluble salt content data of soil profile at 1 meter of a large sample size.

In addition, it should be noted that the salt content data (that is, $Y_{0\text{-}0.2m}$) of the soil surface layer of each soil sample point in the second soil sample point set in this step also needs to be saved separately, and the saved data will be used with the remote sensing image data for selecting the optimal independent variables subsequently.

S23. The temporal resolutions of the Sentinel-2 satellite remote sensing image historical sequence obtained in S1 are normalized to obtain a monthly average Sentinel-2 image data set with the spatial resolutions and the temporal resolutions both unified. In this embodiment, the spatial resolutions are all 10 m, and the temporal resolutions are all one month. Therefore, when performing normalization processing, the operation is mainly directed to data comprising multiple satellite remote sensing images in one month. All Sentinel-2 satellite remote sensing images in the same month are averaged, and the averaged image is used as the satellite remote sensing image of the month and classified into an average Sentinel-2 image data set. In a specific implementation, for the monthly average of the remote sensing images, the pixel-by-pixel calculation method may be adopted, and single images are classified using a month as a target time unit. Calculation is performed on full bands in all single Sentinel-2 satellite remote sensing images classified into the same month, the grid values at the same location are added pixel by pixel and averaged, then a monthly average Sentinel-2 data set of a long time series, a spatial resolution of 10 m, and a temporal resolution of 1 month may be obtained. After normalization of temporal resolution, it may be ensured that time-series of the same length comprise images of the same quantity, which avoids inconsistency in input data during subsequent modeling.

S3. The calculation results of the salt content (0-0.2 meters) of the soil surface layer obtained in S21 and the single Sentinel-2 images during the same period with the ground survey obtained in S23 are used as relevant variables. For the observation of salt of the soil surface layer, optimal independent variables are selected based on the remote sensing data. Also, a long time series independent variable data set is constructed. The specific steps are as follows.

S31. Based on the single Sentinel-2 satellite remote sensing image data and the salt content data of the soil surface layer of each of the soil sample points in the second soil sample point set obtained in S22, an independent variable set to be selected is constructed as explanatory variables by using a single band and band combination method for calculation, the salt content of the soil surface layer is used as an explained variable, and an independent variable select model is constructed to select optimal features (that is, indices) in the independent variable set to be selected to obtain an optimal independent variable combination for observing the salt content of the soil surface layer. It should be noted that since the single Sentinel-2 satellite remote sensing image data is spatially continuous grid data, while the salt content data of the soil surface layer of each soil sample point in the second soil sample point set obtained in S22 is discrete point data, the sensing image data and the salt content data need to be matched according to coordinates of soil sample points during modeling. Corresponding feature values of soil sample points in the remote sensing images and the salt contents of the soil surface layers of the same soil sample points are used as sample data.

It should be noted that, in this step, the salt content data of the soil surface layer is used to construct the independent variable select model together with the remote sensing image, not the total salt content data of soil profile at 1 meter, which is because that the spectrum in the Sentinel-2 satellite remote sensing image may only inverse the physical and chemical information of the soil surface layer, but cannot inverse the physical and chemical information of deep soil.

In this embodiment, the independent variable select model selected is the random forest model, and the independent variable set to be selected for screening should include four categories of characteristics: spectral features, vegetation index features, salt index features, and soil-related indices. The four types of features should try to cover different feature types so that a best combination of explanatory features may be obtained from selecting. The specific feature types to choose may be determined based on expert experience or related research and literature. The random forest model is based on two built-in evaluation indicators, a significance of a mean square error (% IncMSE) and a purity of a node (IncNodePurity), as evaluation criteria to select features in the independent variable set to be selected to serve as independent variables to explain the salt content in the topsoil, and several features with the highest correlation with the salt content in the topsoil are obtained to form the optimal independent variable combination. The specific features to include in the optimal independent variable combination need to be determined based on respective correlation coefficients and the accuracy of the subsequent soil profile salinity estimate. In this embodiment, the spectral band, vegetation index, salt index, and soil-related index are independent variables, the salt content of the topsoil (0-0.2 meters) is the dependent variable, and the number of trees in the random forest is 500. When constructing each decision tree, the number of variables randomly selected is in a range of [1, 20], and the model is cycled with the minimum root mean square error as the parameter selection criterion.

S32. After the optimal independent variable combination is determined, each feature value in the optimal independent variable combination is calculated pixel by pixel for each satellite remote sensing image in the monthly average Sentinel-2 image data set to obtain a long time series index data set based on the remote sensing images.

S4. Feature values in the optimal independent variable combination in the long time series index data set corresponding to each soil sample point (large sample size) in the second soil sample point set serve as the independent variables, the total salt content of soil profile at 1 meter of each soil sample point in the second soil sample point set obtained in S22 serve as dependent variable, and a spatiotemporal regression model is constructed. Finally, based on the long time series index data set obtained in S32, the salt content of soil profile at 1 meter at locations of each pixel in the area to be measured is predicted by using the spatiotemporal regression model obtained from the training, and a spatial distribution map (large-space-scale) of the salt contents of soil profile at 1 meter corresponding to the period to be estimated is formed.

It should be noted that the long time series index data set is a spatially continuous grid map, while the total salt contents of soil profile at 1 meter of each soil sample point in the second soil sample point set obtained in S22 are discrete points, when constructing the spatiotemporal regression model, matching is needed in the grid of long time series index data set according to location information of each soil sample point in the second soil sample point set to obtain the value of each feature in the optimal independent variable combination corresponding to each soil sample point to serve as the independent variables.

In this embodiment, the spatiotemporal regression model used is a regression model constructed based on the temporal convolution network. The specific construction method is as follows.

A training set and a testing set are randomly generated in a ratio of 2:1. The training set and the testing set are normalized respectively, and the formula is $Y=(X-X_{min})/(X_{max}-X_{min})$. In the formula, Y represents normalized data, X represents data to be normalized, $X_{max}$ and $X_{min}$ represent a maximum value and a minimum value of X respectively. After calculation is performed, data normalized to an interval [−1, 1] is obtained.

In the modeling of the training set and the testing set, since the specific sequence length in the Sentinel-2 satellite remote sensing image historical sequence has an impression on the final estimate effect, a principle of the best fitting according to the performance of the model in the testing set may be used to select the length of the historical sequence. In this embodiment, after selecting is performed, the length of the historical sequence independent variable is determined to be the index set in a previous two-year period as an optimal time-series independent variable. The previous two-year period refers to Sentinel-2 satellite remote sensing images of the area to be measured obtained from three years before the period to be estimated to one year before the period to be estimated as the Sentinel-2 satellite remote sensing image historical sequence, the time span is 24 months, and the image spatial resolution is 10 m.

When training a temporal convolution network TCN, a cross-validation mode of the training set is set to a ten-fold cross-validation, the model used is the TCN regression model. TCN trains the time-series independent variable data set with a causal convolution module, the kernel initializer is He_normal, the activation function in the convolution layer is ReLU, the kernel size used in each convolution layer is 8, the jump parameter filter in the expanded convolution is 1, the dilation parameter dilation base in the context of the convolutional layer is 7, and the expansion factor corresponding to the time dilation module are [1, 2, 4, 8, 16, 32, 64, 128, 256]. When training the training set, the learning rate is set to 0.005, the probability parameter of the dropout rate of weight regularization parameters is set to 0.5, and a model of reduced loss rate and increased learning rate is obtained. According to the model optimization and parameter settings, a regression model of independent variable versus dependent variable is constructed for each grid in the area to be measured for calculating the salt content data of soil profile at 1 meter of the area to be measured with a resolution of 10 m.

In order to further facilitate understanding of the advantages of the disclosure, the method for jointly estimating soil profile salinity by using a time-series remote sensing image in the S1~S4 steps in the above embodiments is applied to a specific case in order to demonstrate the specific technical effects.

EMBODIMENT

In this case, a cotton planting field in the Xinjiang Alar Reclamation Region (81° 17'–81° 22'E, 40° 28'–40° 31'N) is selected as a research area. Calculation is performed by using soil sample point data and earth conductivity data obtained from ground surveys on Nov. 1, 2020 and Nov. 2, 2019, the obtained salt content of soil profile at 1 meter is used as the dependent variable, the single Sentinel-2 remote sensing image data of the same period and the image data of the time-series of the previous two years are used as the independent variables, a regression model is constructed based on random forest-temporal convolution network (RF-TCN), and finally spatial distribution data of the salt content of the soil profile with a spatial resolution of 10 m and an estimate depth of 1 meter is obtained. The basic steps of the method for estimating are as described in S1~S4 of the embodiments, so details will not be repeated here. The following mainly shows the specific data and implementation details.

step 1) Obtain data: soil profile samples (small spatial range, small sample) of the research area are obtained at soil layer depths of 0-0.2 m, 0.2-0.4 m, 0.4-0.6 m, 0.6-0.8 m, and 0.8-1 m respectively, measuring is performed simultaneously at depths of 0.75 meters and 1.5 meters respectively, conductivity data (small spatial range, large sample) in four measurement modes in the horizontal direction and the vertical direction is obtained based on the EM38-MK2 electromagnetic induction meter, and single Sentinel-2 remote sensing images of the same period as the ground surveys are obtained. In the same research area, Sentinel-2 satellite remote sensing images (large spatial range, long time series) with a 10 m resolution available within the previous two-year period are obtained.

In the embodiment, Sentinel-2 data is an L1 product released by the European Space Agency (ESA). Sentinel-2 comprises two polar-orbiting satellites (Sentinel-2A and Sentinel-2B). The two satellites have complementary data, a revisit period of 5 days, an orbital period of 100 minutes, and an orbital altitude of 786 kilometers. The scan width is 290 kilometers, and the orbital inclination is 98.62°. Multispectral scanning imaging data (MSI) provides a band with a spatial resolution of 60 m, three bands of 10 m, and two bands of 30 m in the visible to red edge region. The image acquisition time is from October 2015 to November 2020, and a total of 139 images are obtained. The data may be downloaded from the United States Geological Survey (USGS).

step 2) Data preprocessing: the soil sample point data of the five depths obtained in step 1) is processed into salinity data of soil profile at 1 meter. Linear regression is performed on the measured conductivity data ($EC_{1:5}$) of soil layers of the five depths and the soil conductivity data measured by EM38-MK2. The five regression formulas are:

$$EC_{1:5(0-0.2m)} = 0.102 + 0.013 \times EC_{ah0.75} + 0.018 \times EC_{ah1.5} - 0.002 \times EC_{av0.75} + 0.013 \times EC_{av1.5}$$

$$EC_{1:5(0.2-0.4m)} = -0.154 - 0.001 \times EC_{ah0.75} + 0.023 \times EC_{ah1.5} + 0.005 \times EC_{av0.75} - 0.014 \times EC_{av1.5}$$

$$EC_{1:5(0.4-0.6m)} = -0.247 - 0.012 \times EC_{ah0.75} + 0.027 \times EC_{ah1.5} + 0.001 \times EC_{av0.75} - 0.001 \times EC_{av1.5}$$

$$EC_{1:5(0.6-0.8m)} = -0.118 - 0.012 \times EC_{ah0.75} + 0.015 \times EC_{ah1.5} + 0.007 \times EC_{av0.75} - 0.005 \times EC_{av1.5}$$

$$EC_{1:5(0.8-1m)} = 0.028 - 0.009 \times EC_{ah0.75} + 0.013 \times EC_{ah1.5} + 0.003 \times EC_{av0.75} - 0.004 \times EC_{av1.5}$$

In the formula, $EC_{ah0.75}$ represents a conductivity measured in the horizontal mode at a depth of 0.75 meters, $EC_{ah1.5}$ represents a conductivity measured in the horizontal mode at a depth of 1.5 meters, $EC_{av0.75}$ represents a conductivity measured in the vertical mode at a depth of 0.75 meters, and $EC_{av1.5}$ represents a conductivity measured in the vertical mode at a depth of 1.75 meters. After obtaining the $EC_{1:5}$ data whose decimal places are the same as the conductivity data points, the salt contents of the profile of the five soil layer depths (0.2 meters) are calculated by using the formula Y=V×p×c. In the formula, Y represents the salt content of the profile calculated, V represents the volume of the soil, ρ represents the soil bulk density, and c represents the soluble salt content. The salt contents of the profile of soil layers of every 0.2 meter interval calculated are integrated by using the accumulation method. The calculation formula is $Y_{0-1m}=Y_{0-0.2m}+Y_{0.2-0.4m}+Y_{0.4-0.6m}+Y_{0.6-0.8m}+Y_{0.8-1m}$. In the formula, $Y_{0-1m}$ represents the total salt content of soil profile at 1 meter; and $Y_{0-0.2m}$, $Y_{0.2-0.4m}$, $Y_{0.4-0.6m}$, $Y_{0.6-0.8m}$, and $Y_{0.8-1m}$ are respectively the salt contents of the five soil layer depths. For sample points of the total salt content of the 1-meter soil profile in November 2020 and November 2019 calculated, 545 are of the 2020 data set, and 37 are of the 2019 data set.

The Sentinel-2 remote sensing data obtained in step 1) is preprocessed. Radiometric calibration and atmospheric correction is performed on the Sentinel-2 data by using the Sen2Cor module in the Sentinel Application Platform (SNAP) package, and MSI images are converted to surface reflectance format and output. 139 Sentinel-2 images with a spatial resolution of 10 m are obtained. Classification is performed using month as a target time unit, calculation is performed on full bands of the 139 single Sentinel-2 images using the pixel-by-pixel calculation method, and the grid values are added pixel by pixel and averaged to obtain monthly average images in a period of October 2015 to November 2020 with a total of 60 periods of data. The spatial resolution of each period of data is 10 m, and the temporal resolution is 1 month.

step 3) Select independent variables: for the single Sentinel-2 images of Nov. 1, 2020 processed after step 2), a band and band combination method is used for calculation to obtain a spectral feature, a vegetation index feature, a salt index feature, and a soil-related index feature to serve as independent variables to be evaluated. The salt content data of the topsoil (0-0.2 meters, 545 samples) on Nov. 1, 2020 processed after step 2) is used as a related variable, and an RF model is constructed for each soil sample point using the "varImp" function of the "caret" package provided in the R software. The specific characteristics of the model are as follows. The random forest (RF) method is based on built-in evaluation indicators, the significance of the mean square error (% IncMSE) and the purity of the node (IncNodePurity) are evaluation criteria to screen for the independent variables, and indices with high correlation with the salt content of the topsoil are obtained. The spectral band, the vegetation index, the salt index, and the soil-related index are used as the independent variables, the salt content of the topsoil (0-0.2 meters) is the dependent variable, and the number of trees in the random forest is 500. When constructing each decision tree, the number of variables randomly selected is in a range of [1, 20], and the model is cycled with the minimum root mean square error as a parameter optimization selection criterion. After optimization of the independent variable select model, 22 indices are obtained as the optimal independent variables for observing the salt content of the soil surface layer, including SI, S1, S2, S3, S6, S7, CRSI, SSSI-2, SI-T, SI4, NDSI, BI, CYEX, CAEX, CLEX, GVMI, RVI, GARI, DVI, EVI, OSAVI, and ENDVI. The full name and band calculation formula of the independent variable obtained by each screen are as follows.

Based on the 545 soil sample points of Nov. 1, 2020 obtained in step 2), a training set and a testing set are randomly generated at a ratio of 2:1. The 37 soil sample points of Nov. 2, 2019 obtained in step 2) are used as a 2019 testing set. In order to enhance the efficiency of model operation, the training set and the testing set are normalized respectively, and the formula is $Y=(X-X_{min})/(X_{max}-X_{min})$. In the formula, Y represents normalized data, X represents data to be normalized, and $X_{max}$ and $X_{min}$ represent a maximum value and a minimum value of X respectively. After calculation is performed, data normalized to an interval [−1, 1] is obtained. In the modeling of the training set and the testing set, the length of the time-series is screened according to a principle of a highest goodness of fit of the performance of the TCN model in a 2020 testing set. After selecting is performed, the length of the independent variables of the time-series is used as independent variables of an optimal time-series for the index set in the previous two years. When estimating the salt content of the soil profile of November 2020, monthly average data (24 months) in a period of October 2017 to October 2019 is used as independent variables; and when estimating the salt content of the soil profile of November 2019, monthly average data (24 months) in a period of October 2016 to October 2018 is used as independent variables.

The TCN regression model is trained on the training set using the ten-fold cross validation method, and the

| Explanation | Abbreviations | Formulations |
|---|---|---|
| Salinity index | SI | $(G + R)^{0.5}$ |
| Salinity Index4 | SI4 | $SWIR_1/NIR$ |
| Salinity index I | S1 | B/R |
| Salinity index II | S2 | (B − R)/(B + R) |
| Salinity index III | S3 | G × R/B |
| Salinity index VI | S6 | R × NIR/G |
| Salinity index VII | S7 | $(SWIR_1 - SWIR_2)/(SWIR_1 + SWIR_2)$ |
| Salinity Index | SI-T | R/NIR × 100 |
| Soil Salinity and Sodicity Indices2 | SSSI-2 | (R × NIR − NIR × NIR)/R |
| Normalized Difference Salinity Index | NDSI | $(NIR - SWIR_1)/(NIR + SWIR_1)$ |
| Canopy Response Salinity Index | CRSI | $[(NIR \times R - G \times B)/(NIR \times R + G \times B)]^{0.5}$ |
| Clay index | CLEX | $SWIR_1/SWIR_2$ |
| Gypsum index | GYEX | $(SWIR_1 - NIR)/(SWIR_2 + NIR)$ |
| Carbonate index | CAEX | G/B |
| Brightness index | BI | $(G^2 + B^2)^{0.5}$ |
| Ratio vegetation index | RVI | NIR/R |
| Enhanced Normalized Differential Vegetation Index | ENDVI | $(NIR + SWIR_1 - R)/(NIR + SWIR_2 + R)$ |
| Green atmospherically resistant vegetation index | GARI | {NIR − [G + 0.6 × (B − R)]}/{NIR + [G + 0.6 × (B − R)]} |
| Differential Vegetation Index | DVI | NIR − R |
| Enhanced Vegetation Index | EVI | (1 + L) × (NIR − R)/(NIR + C1 × R − C2 × B + L) |
| Optimized Soil-Adjusted Vegetation Index | OSAVI | (NIR − R)/(NIR + R + 0.16) |
| Global Vegetation Moisture Index | GVMI | $[(NIR + 0.1) - (SWIR_1 + 0.02)]/[(NIR + 0.1) + (SWIR_1 + 0.02)]$ |

Band combination calculation is performed on the 60-months Sentinel-2 monthly average data set with the spatial resolution of 10 m and the temporal resolution of 1 month obtained after step 2). 22 indices calculated by monthly average images are calculated respectively.

step 4) Estimate salt content of soil profile: the data set of the 22 time series indices based on the monthly average remote sensing images obtained in step 3) are used as the independent variables, the soluble salt content data of soil profile at 1 meter obtained in step 2) is used as the dependent variable, and a regression model is constructed based on temporal convolution network. The specific method is as follows.

24-months time-series independent variable data set is trained with a causal convolution module. The kernel initializer is He_normal, the activation function in the convolution layer is ReLU, the kernel size used in each convolution layer is 8, the jump parameter filter in the expanded convolution is 1, the dilation parameter dilation base in the context of the convolutional layer is 7, and the expansion factor corresponding to the time dilation module are [1, 2, 4, 8, 16, 32, 64, 128, 256]. When training the training set, the learning rate is set to 0.005, the probability parameter of the dropout rate of weight regularization parameters is set to 0.5, and a model of reduced loss rate and increased learning rate is obtained. In modeling and testing of the 2020 data set and testing of the 2019 data set, a regression model of independent variable to dependent variable is constructed for each grid in the area to be measured according to model optimization and parameter settings, and the salt content data of soil profile at 1 meter with 10 m resolution of the area to be measured of November 2020 and November 2019 is obtained.

545 ground sample points of 2020 and 37 ground sample points of 2019 are selected as validation points. As shown in FIG. 1, the salt content of the soil profile at 1 meter estimated in this embodiment performs well in the 2020 data training set (a) and the 2020 testing set (b). In the training set, $R^2$=0.66, and in the testing set, $R^2$=0.65. In terms of validation of time-scale migration capability, the salt content of soil profile at 1 meter estimated in this embodiment has reliable accuracy in the 2019 data testing set, and in the testing set, $R^2$-0.71.

Figure 2:
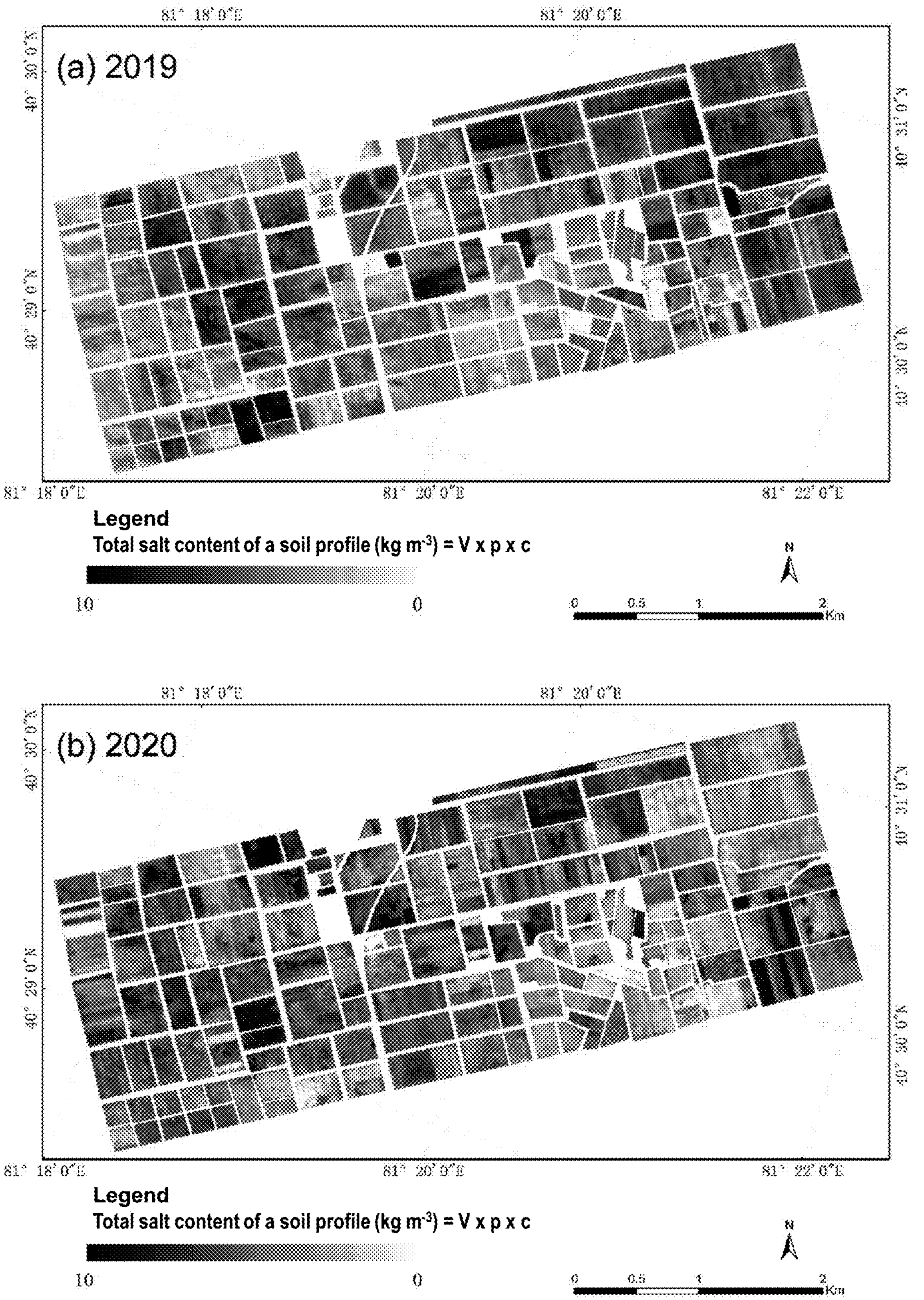
FIG. 2 shows distribution maps of salt contents of soil profile at 1 meter of farmland in southern Xinjiang in 2019 (a of FIG. 2) and 2020 (b of FIG. 2) in the embodiment.

Selecting the cotton planting field in the Xinjiang Alar Reclamation Region as the research area, the distribution maps of the salt content of soil profile at 1 meter estimated in this embodiment of 2020 and 2019 are shown in FIG. 2, with a spatial resolution of 10 m.

The embodiments are only preferred solutions of the disclosure, and the embodiments are not intended to limit the disclosure. Persons of ordinary skill in the relevant technical fields may also make various changes and modifications without departing from the spirit and scope of the disclosure. Therefore, any technical solutions obtained by equivalent substitution or equivalent transformation fall within the protection scope of the disclosure.

What is claimed is:

1. A method for jointly estimating a soil profile salinity by using a time-series remote sensing image, comprising:

S1: obtaining single Sentinel-2 satellite remote sensing image data and ground survey data corresponding to an area to be measured in a period to be estimated; and at the same time, obtaining a Sentinel-2 satellite remote sensing image historical sequence of the area to be measured before the period to be estimated;

wherein, the ground survey data comprises multi-depth measured conductivity data and EM38-MK2 conductivity data collected in the period to be estimated; the multi-depth measured conductivity data comprises segmented conductivity data of each soil sample point in a first soil sample point set, the segmented conductivity data comprises each conductivity of different soil layer depths of a soil profile with a depth of 1 meter measured at locations of the soil sample points after sampling in segments according to a set interval, wherein a soil layer where a soil surface is located is a soil surface layer; the EM38-MK2 conductivity data comprises multi-mode conductivity data of each soil sample point in a second soil sample point set, the multi-mode conductivity data comprises a plurality of conductivities measured at locations of the soil sample points at different depths according to different modes; and the first soil sample point set is a subset of the second soil sample point set;

S2: performing multi-source data matching on the three types of data obtained in S1 according to S21-S23:

S21: performing linear regression on the segmented conductivity data and the multi-mode conductivity data corresponding to each of the soil sample points in the first soil sample point set, so that a linear regression model estimates the segmented conductivity data of same soil sample point based on the multi-mode conductivity data;

S22: for each of the soil sample points in the second soil sample point set, estimating each conductivity of five soil layer depths corresponding to each of the soil sample points by using the linear regression model, and performing conversion according to the conductivities to obtain salt contents of different soil layer depths of the soil profile, and integrating the different soil layer depths to obtain a total salt content of soil profile at 1 meter;

S23: normalizing temporal resolutions of the Sentinel-2 satellite remote sensing image historical sequence obtained in S1, to obtain a monthly average Sentinel-2 image data set with spatial resolutions and the temporal resolutions both unified;

S3: based on the single Sentinel-2 satellite remote sensing image data and the salt content data of the soil surface layer of each of the soil sample points in the second soil sample point set obtained in S22, constructing an independent variable set to be selected as explanatory variables by using a single band and band combination method for calculation, using the salt content of the soil surface layer as an explained variable, and constructing an independent variable select model to perform selecting on variables in the independent variable set to be selected to obtain an optimal independent variable combination for observing the salt content of the soil surface layer; and calculating each feature value in the optimal independent variable combination pixel by pixel for each satellite remote sensing image in the monthly average Sentinel-2 image data set, to obtain a long time series index data set based on the remote sensing image; and S4: using the feature values in the optimal independent variable combination in the long time series index data set corresponding to each of the soil sample points in the second soil sample point set as independent variables, using all of the total salt contents of soil profile at 1 meter of the respective soil sample points in the second soil sample point set obtained in S22 as dependent variables, constructing a spatiotemporal regression model; finally, based on the long time series index data set, predicting the salt content of soil profile at 1 meter at a location of each pixel in the area to be measured by using the spatiotemporal regression model, and forming a spatial distribution map of the salt contents of soil profile at 1 meter corresponding to the period to be estimated.

2. The method for jointly estimating the soil profile salinity by using the time-series remote sensing image according to claim 1, wherein in the multi-depth measured conductivity data, the soil profile with the depth of 1 meter are sampled in segments at each of the soil sample points according to an interval of 0.2 m at 0-0.2 m, 0.2-0.4 m, 0.4-0.6 m, 0.6-0.8 m, and 0.8-1 m, a conductivity of each of the segments of the soil is measured, and the conductivity of each of the five soil layer depths are obtained to form the multi-depth measured conductivity data.

3. The method for jointly estimating the soil profile salinity by using the time-series remote sensing image according to claim 1, wherein in the EM38-MK2 conductivity data, four conductivities are measured respectively in a horizontal mode and a vertical mode at the depth of 0.75 meters and at the depth of 1.5 meters at each of the soil sample points by using an EM38-MK2 electromagnetic induction meter to form the multi-mode conductivity data.

4. The method for jointly estimating the soil profile salinity by using the time-series remote sensing image according to claim 1, wherein the Sentinel-2 satellite remote sensing image historical sequence is a Sentinel-2 satellite remote sensing image of the area to be measured obtained from three years before the period to be estimated to one year before the period to be estimated, a time period is 24 months, and an image spatial resolution is 10 m.

5. The method for jointly estimating the soil profile salinity by using the time-series remote sensing image according to claim 1, wherein the linear regression model is in a form as follows:

$$EC_{1:5\ (a-bm)} = A + B \times EC_{ah0.75} + C \times EC_{ah1.5} + D \times EC_{av0.75} + E \times EC_{av1.5}$$

wherein $EC_{1:5(a\text{-}bm)}$ represents a conductivity corresponding to a soil layer depth of a-b m, $EC_{ah0.75}$ represents the conductivity measured in a horizontal mode at the depth of 0.75 meters by using an EM38-MK2 electromagnetic induction meter, $EC_{ah1.5}$ represents the conductivity measured in the horizontal mode at the depth of 1.5 meters by using the EM38-MK2 electromagnetic induction meter, $EC_{av0.75}$ represents the conductivity measured in a vertical mode at the depth of 0.75 meters by using the EM38-MK2 electromagnetic induction meter, and $EC_{av1.5}$ represents the conductivity measured in the vertical mode at the depth of 1.75 meters by using the EM38-MK2 electromagnetic induction meter, and A, B, C, D, and E represent five regression coefficients respectively.

6. The method for jointly estimating the soil profile salinity by using the time-series remote sensing image according to claim 1, wherein in S22, when performing conversion according to the conductivities to obtain the salt contents of the different soil layer depths of the soil profile, soluble salt contents are first converted based on the conductivities, and then the salt contents of the soil are calculated according to the soluble salt contents.

7. The method for jointly estimating the soil profile salinity by using the time-series remote sensing image according to claim 1, wherein in S22, an integration method for integrating the different soil layer depths to obtain the total salt content of soil profile at 1 meter is an accumulation method, an accumulation formula is:

$$Y_{0-1m} = Y_{0-0.2m} + Y_{0.2-0.4m} + Y_{0.4-0.6m} + Y_{0.6-0.8m} + Y_{0.8-1m}$$

wherein, $Y_{0\text{-}1m}$ represents the total salt content of soil profile at 1 meter, $Y_{0\text{-}0.2m}$, $Y_{0.2\text{-}0.4m}$, $Y_{0.4\text{-}0.6m}$, $Y_{0.6\text{-}0.8m}$, and $Y_{0.8\text{-}1m}$ are respectively the salt contents of the five soil layer depths, 0-0.2 m, 0.2-0.4 m, 0.4-0.6 m, 0.6-0.8 m, and 0.8-1 m.

8. The method for jointly estimating the soil profile salinity by using the time-series remote sensing image according to claim 1, wherein each satellite remote sensing image in the monthly average Sentinel-2 image data set is obtained by averaging all Sentinel-2 satellite remote sensing images in same month.

9. The method for jointly estimating the soil profile salinity by using the time-series remote sensing image according to claim 1, wherein in S3, the independent variable select model is a random forest model, and the independent variable set to be selected comprises a spectral feature, a vegetation index feature, a salt index feature, and a soil-related index feature; the random forest model selects the variables in the independent variable set to be selected based on a significance of a mean square error and a purity of a node, to obtain several variables with a highest correlation with a soil salt content in a topsoil to form the optimal independent variable combination.

10. The method for jointly estimating the soil profile salinity by using the time-series remote sensing image according to claim 1, wherein the spatiotemporal regression model in S4 is a regression model constructed based on a temporal convolution network.

* * * * *